US012638072B2

(12) United States Patent　　(10) Patent No.:　US 12,638,072 B2
Suzuki et al.　　(45) Date of Patent:　May 26, 2026

(54) VEHICLE DRIVE DEVICE

(71) Applicant: AISIN CORPORATION, Kariya (JP)

(72) Inventors: Tomoyuki Suzuki, Kariya (JP);
Nozomu Takahashi, Kariya (JP)

(73) Assignee: AISIN CORPORATION, Kariya (JP)

( * ) Notice: Subject to any disclaimer, the term of this patent is extended or adjusted under 35 U.S.C. 154(b) by 277 days.

(21) Appl. No.: 18/285,357

(22) PCT Filed: Jun. 29, 2022

(86) PCT No.: PCT/JP2022/025943
§ 371 (c)(1),
(2) Date: Oct. 2, 2023

(87) PCT Pub. No.: WO2023/277058
PCT Pub. Date: Jan. 5, 2023

(65) Prior Publication Data
US 2025/0149953 A1　　May 8, 2025

(30) Foreign Application Priority Data

Jun. 30, 2021　(JP) ................................. 2021-109499

(51) Int. Cl.
*H02K 7/116*　　(2006.01)
*B60L 15/00*　　(2006.01)
(Continued)

(52) U.S. Cl.
CPC .......... *F16H 57/027* (2013.01); *B60L 15/007* (2013.01); *F16H 57/037* (2013.01);
(Continued)

(58) Field of Classification Search
CPC .. F16H 57/027; F16H 57/037; F16H 57/0404; F16H 57/0417; F16H 57/0436;
(Continued)

(56) References Cited

U.S. PATENT DOCUMENTS

| | | | |
|---|---|---|---|
| 10,008,904 B2 * | 6/2018 | Kuramochi ............ | B60K 6/405 |
| 10,272,767 B1 * | 4/2019 | Tang ......................... | F01P 5/10 |

(Continued)

FOREIGN PATENT DOCUMENTS

| | | | | |
|---|---|---|---|---|
| CN | 112152384 A | * | 12/2020 | ............... H02K 9/19 |
| JP | 2015175291 A | * | 10/2015 | |

(Continued)

OTHER PUBLICATIONS

Jul. 25, 2024 extended Search Report issued in European Patent Application No. 22833204.5.
(Continued)

*Primary Examiner* — Steve Clemmons
(74) *Attorney, Agent, or Firm* — Oliff PLC

(57)　　ABSTRACT

A case includes a rotary electric machine housing chamber that houses a rotary electric machine, and an oil storage space provided in a lower part of the rotary electric machine housing chamber. At least one of a pair of output members is disposed in a space that communicates with the rotary electric machine housing chamber. An oil pump is disposed in the oil storage space at a position on a lower side of a first axis that is a rotation axis of the rotary electric machine and a second axis that is a rotation axis of the pair of output members so as to overlap an output gear in an axial view along the second axis.

9 Claims, 4 Drawing Sheets

(51) Int. Cl.
*F16H 57/02* (2012.01)
*F16H 57/027* (2012.01)
*F16H 57/037* (2012.01)
*F16H 57/04* (2010.01)
*B60K 1/00* (2006.01)

(52) U.S. Cl.
CPC ..... *F16H 57/0404* (2013.01); *F16H 57/0417*
(2013.01); *F16H 57/0436* (2013.01); *F16H*
*57/045* (2013.01); *F16H 57/0476* (2013.01);
*H02K 7/116* (2013.01); *B60K 2001/001*
(2013.01); *B60K 2001/003* (2013.01); *F16H*
*2057/02026* (2013.01); *F16H 2057/02034*
(2013.01); *F16H 2057/02052* (2013.01); *H02K*
*2205/09* (2013.01)

(58) Field of Classification Search
CPC ............... F16H 57/045; F16H 57/0476; F16H
57/0441; F16H 57/0457; F16H 57/0483;
F16H 57/0495; F16H 2057/02026; F16H
2057/02034; F16H 2057/02052; B60L
15/007; H02K 7/116; H02K 9/19; H02K
5/04; H02K 2205/09
See application file for complete search history.

(56) References Cited

U.S. PATENT DOCUMENTS

| | | | | |
|---|---|---|---|---|
| 10,371,254 | B2 * | 8/2019 | Fukui | F16H 57/0439 |
| 11,137,061 | B2 * | 10/2021 | Ishikawa | F16H 57/0441 |
| 12,101,003 | B2 * | 9/2024 | Fujimoto | F16H 57/027 |
| 2020/0266687 | A1 * | 8/2020 | Nakamatsu | B60K 1/00 |
| 2021/0001713 | A1 * | 1/2021 | Sakurada | H02K 7/116 |

FOREIGN PATENT DOCUMENTS

| | | | | |
|---|---|---|---|---|
| JP | 2019173943 | A | * | 10/2019 |
| JP | 2020-137405 | A | | 8/2020 |
| JP | 2020-178485 | A | | 10/2020 |
| JP | 2021-10269 | A | | 1/2021 |
| WO | 2021/079664 | A1 | | 4/2021 |

OTHER PUBLICATIONS

Sep. 13, 2022 International Search Report issued in International
Patent Application No. PCT/JP2022/025943.

* cited by examiner

VEHICLE DRIVE DEVICE

TECHNICAL FIELD

The present disclosure relates to a vehicle drive device including a rotary electric machine, a transmission mechanism that transmits a driving force between the rotary electric machine and a pair of output members, an oil pump that supplies oil to the rotary electric machine, and a case.

BACKGROUND ART

An example of such a vehicle drive device is disclosed in Japanese Unexamined Patent Application Publication No. 2020-137405 (JP 2020-137405 A) (Patent Document 1). The reference signs shown in parentheses in the description of the background art are those of Patent Document 1. A motor unit (1) of Patent Document 1 includes a motor (2), a gear unit (3) that transmits a driving force between the motor (2) and a pair of axles (55), a pump (96) that supplies oil to the motor (2), and a housing (6) that houses the motor (2) and the gear unit (3). The housing (6) includes a motor chamber (81) that houses the motor (2), and the pump (96) is disposed below the motor chamber (81) as described in paragraph 0061 of Patent Document 1. As described in paragraph 0070 of Patent Document 1, the pump (96) is fixed to the outer peripheral surface of the housing (6). Thus, in the motor unit (1) serving as the vehicle drive device in Patent Document 1, the pump (96) serving as the oil pump is fixed to the lower outer peripheral surface of the housing (6) serving as the case.

RELATED ART DOCUMENTS

Patent Documents

Patent Document 1: Japanese Unexamined Patent Application Publication No. 2020-137405 (JP 2020-137405 A)

SUMMARY OF THE DISCLOSURE

Problem to be Solved by the Disclosure

As described above, in the vehicle drive device of Patent Document 1, the oil pump is fixed to the lower outer peripheral surface of the case. Therefore, it is likely that a structure for protecting the oil pump from stone chippings, protruding objects on the ground, or the like is needed as typified by an increase in the thickness of the case of the oil pump. Thus, it is likely that the size of the vehicle drive device increases.

In view of this, there is a demand to realize a technology that facilitates downsizing of the vehicle drive device when the vehicle drive device includes the oil pump that supplies oil to the rotary electric machine.

Means for Solving the Problem

A vehicle drive device according to the present disclosure includes a rotary electric machine, a pair of output members drivingly connected to a pair of wheels, a transmission mechanism configured to transmit a driving force between the rotary electric machine and the pair of output members, an oil pump configured to supply cooling oil to the rotary electric machine, and a case that houses the rotary electric machine, the transmission mechanism, and the oil pump. The rotary electric machine and the pair of output members are disposed separately on two parallel axes. The transmission mechanism includes a differential gear mechanism configured to distribute the driving force transmitted from the rotary electric machine side to the pair of output members, and an output gear drivingly connected to the pair of output members coaxially with the pair of output members. The output gear is connected to a differential case of the differential gear mechanism so as to rotate integrally with the differential case. The case includes a rotary electric machine housing chamber that houses the rotary electric machine, and an oil storage space provided in a lower part of the rotary electric machine housing chamber. At least one of the pair of output members is disposed in a space that communicates with the rotary electric machine housing chamber. The oil pump is disposed in the oil storage space at a position on a lower side of a first axis that is a rotation axis of the rotary electric machine and a second axis that is a rotation axis of the pair of output members so as to overlap the output gear in an axial view along the second axis.

According to this configuration, the oil pump configured to supply the oil to the rotary electric machine is disposed in the oil storage space inside the case. Therefore, the oil pump can be protected from the outside of the vehicle drive device by using the case. Thus, it is possible to reduce the need to separately provide a structure for protecting the oil pump from stone chippings, protruding objects on the ground, or the like, thereby easily downsizing the vehicle drive device.

According to this configuration, the oil pump disposed in the oil storage space as described above is disposed at the position on the lower side of the first axis and the second axis so as to overlap the output gear in the axial view. Therefore, the space in the oil storage space that overlaps the output gear in the axial view can effectively be used as the disposition space of the oil pump. Thus, the dimension of the vehicle drive device in the axial view can be reduced easily. According to this configuration, at least one of the pair of output members is disposed in the space that communicates with the rotary electric machine housing chamber. Therefore, the rotary electric machine and the output member can be disposed close to each other in the radial direction of the rotary electric machine compared to a configuration in which a wall is provided between the rotary electric machine and the output member. In this respect as well, the dimension of the vehicle drive device in the axial view can be reduced easily.

As described above, with this configuration, the downsizing of the vehicle drive device is facilitated when the vehicle drive device includes the oil pump that supplies oil to the rotary electric machine.

Further features and advantages of the vehicle drive device will become apparent from the following description of an embodiment that will be given with reference to the drawings.

MODES FOR CARRYING OUT THE DISCLOSURE

An embodiment of a vehicle drive device will be described with reference to the drawings. In the following description, an up-down direction V (see FIG. 4 etc.) is a direction along the vertical direction of a vehicle drive device 100 in use, that is, a direction along the vertical direction when the vehicle drive device 100 is disposed in a direction in which it is used. Since the vehicle drive device 100 is mounted on a vehicle 200 (see FIG. 1) in use, the up-down direction V is a direction along the vertical direction in a state in which the vehicle drive device 100 is mounted on the vehicle 200 (hereinafter referred to as "vehicle-mounted state"), more specifically, a direction along the vertical direction when the vehicle 200 is in the vehicle-mounted state and is stopped on a flat road (road along a horizontal plane). An upper side V1 and a lower side V2 mean an upper side and a lower side in the up-down direction V. The direction of each member in the following description represents a direction of the member mounted on the vehicle drive device 100. Terms related to the dimension, the disposition direction, the disposition position, and the like of each member represent concepts that include a state in which there is a difference due to a variation (variation to an extent permissible in manufacturing).

The term "drivingly connected" herein refers to a state in which two rotation elements are connected so that a driving force (synonymous with torque) can be transmitted, and includes a state in which the two rotation elements are connected so as to rotate integrally or a state in which the two rotation elements are connected so as to be able to transmit a driving force via one, two, or more transmission members. Such transmission members include various members that transmit rotation at the same speed or at a shifted speed (such as a shaft, a gear mechanism, a belt, and a chain). The transmission members may include an engagement device that selectively transmits rotation and a driving force (such as a friction engagement device and an inter-mesh engagement device).

The "rotary electric machine" is herein used as a concept including any of a motor (electric motor), a generator (power generator), and a motor generator that functions as both a motor and a generator if necessary. Regarding the disposition of two members, the phrase "overlap when viewed in a specific direction" herein means that, when an imaginary straight line parallel to the line-of-sight direction is moved in directions orthogonal to the imaginary straight line, an area where the imaginary straight line intersects both the two members is present at least in part. Regarding the disposition of the two members, the phrase "disposition areas in a specific direction overlap each other" herein means that a disposition area of one member in the specific direction includes at least a part of a disposition area of the other member in the specific direction.

Figure 3:
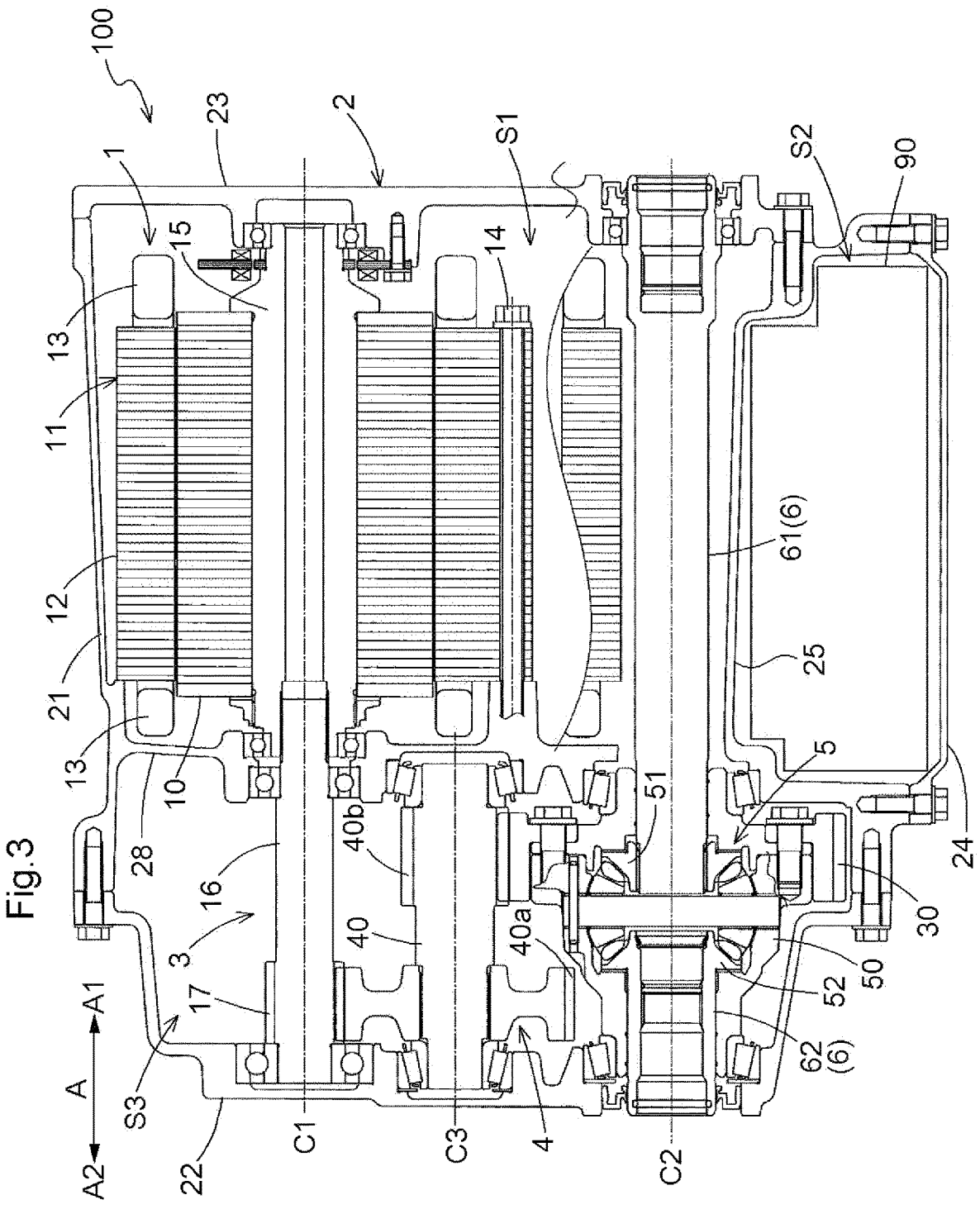
FIG. 3 is a sectional view of the vehicle drive device according to the embodiment.
Figure 5:
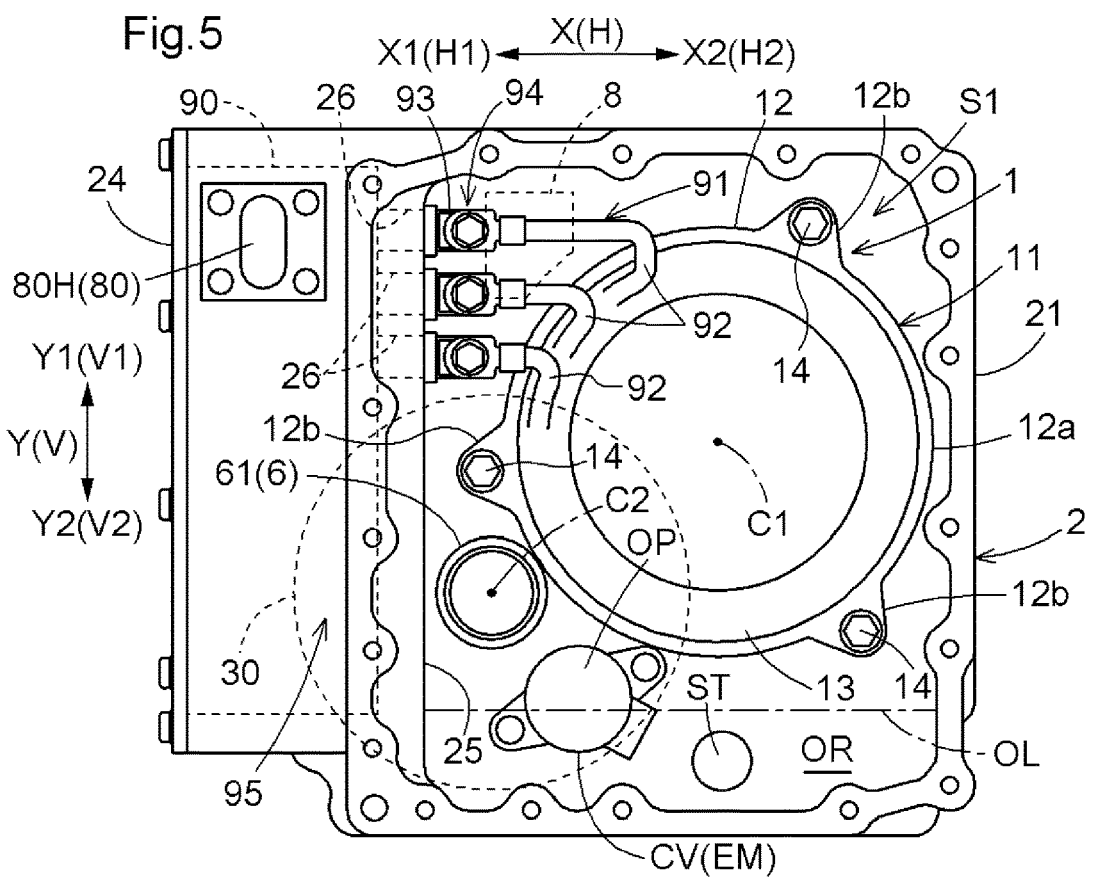
FIG. 5 is a diagram showing the disposition relationship of the components of the vehicle drive device according to the embodiment in the axial view.

As shown in FIGS. 3 and 5, the vehicle drive device 100 includes a rotary electric machine 1, a pair of output members 6 drivingly connected to a pair of wheels W (see FIG. 1), a transmission mechanism 3 that transmits a driving force between the rotary electric machine 1 and the pair of output members 6, an oil pump OP, and a case 2. The case

2 houses the rotary electric machine 1, the transmission mechanism 3, and the oil pump OP. In the present embodiment, the vehicle drive device 100 further includes an inverter device 90 that is housed in the case 2 and controls the drive of the rotary electric machine 1. The case 2 also houses the pair of output members 6.

Figures 1, 2:
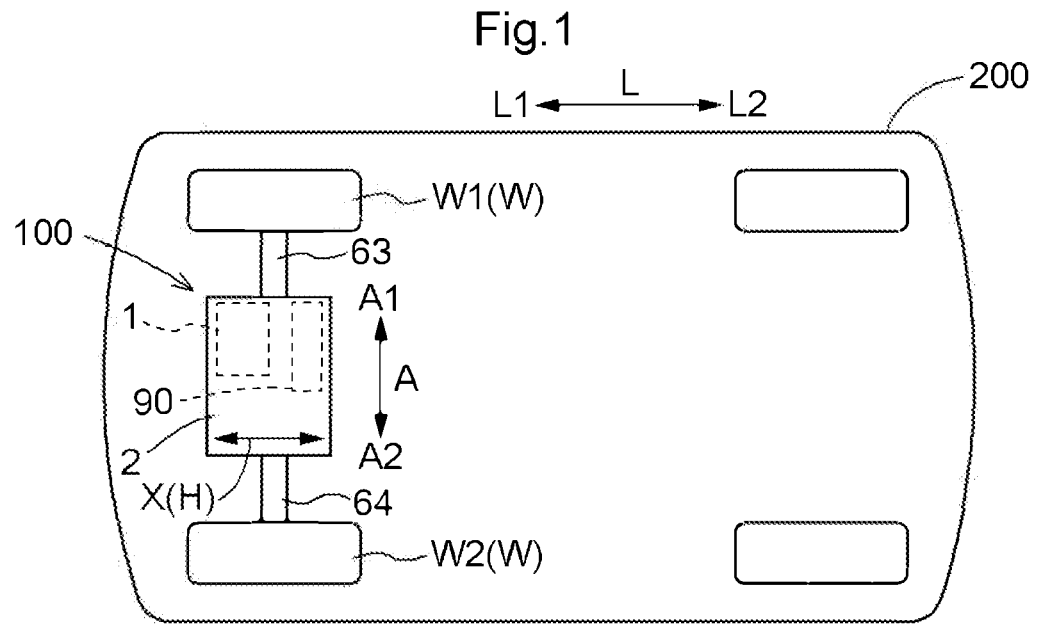
FIG. 1 is a schematic diagram of a vehicle including a vehicle drive device according to an embodiment.
FIG. 2 is a perspective view of the vehicle drive device according to the embodiment.

A first output member 61 that is one of the pair of output members 6 is drivingly connected to a first wheel W1 that is one of the pair of wheels W, and a second output member 62 that is the other of the pair of output members 6 is drivingly connected to a second wheel W2 that is the other of the pair of wheels W. As shown in FIG. 1, the vehicle 200 including the vehicle drive device 100 includes a first drive shaft 63 that rotates integrally with the first wheel W1, and a second drive shaft 64 that rotates integrally with the second wheel W2. The first drive shaft 63 is connected to the first wheel W1, for example, via a constant velocity joint, and the second drive shaft 64 is connected to the second wheel W2, for example, via a constant velocity joint. The first output member 61 is connected to the first drive shaft 63 so as to rotate integrally with the first drive shaft 63, and the second output member 62 is connected to the second drive shaft 64 so as to rotate integrally with the second drive shaft 64.

The vehicle drive device 100 transmits an output torque of the rotary electric machine 1 to the pair of wheels W via the pair of output members 6 to cause the vehicle 200 including the vehicle drive device 100 to travel. That is, the rotary electric machine 1 is a driving force source for the pair of wheels W. The pair of wheels W is a pair of right and left wheels (for example, a pair of right and left front wheels or a pair of right and left rear wheels) in the vehicle 200. In the present embodiment, the rotary electric machine 1 is an alternating-current rotary electric machine to be driven by a three-phase alternating current (example of a multiphase alternating current). The rotary electric machine 1 is electrically connected to a power storage device such as a battery or a capacitor via the inverter device 90 that performs power conversion between direct current power and alternating current power, and is supplied with electric power from the power storage device to perform power running or supply electric power generated by, for example, inertial force of the vehicle 200 to the power storage device to store the electric power.

As shown in FIG. 3, the rotary electric machine 1 and the pair of output members 6 are disposed separately along two parallel axes (specifically, a first axis C1 and a second axis C2). Specifically, the rotary electric machine 1 is disposed on the first axis C1, and the pair of output members 6 is disposed on the second axis C2 different from the first axis C1. The transmission mechanism 3 includes an output gear 30 drivingly connected to the pair of output members 6 coaxially with the pair of output members 6 (that is, on the second axis C2).

As shown in FIG. 1, the vehicle drive device 100 is mounted on the vehicle 200 with an axial direction A along a vehicle right-left direction. The axial direction A is a direction parallel to the first axis C1 and the second axis C2, in other words, an axial direction common to the first axis C1 and the second axis C2. That is, the axial direction A is a direction in which the rotation axis of the rotary electric machine 1 extends, and is also a direction in which the rotation axis of the pair of output members 6 extends. One side in the axial direction A is defined as a first axial side A1, and the other side in the axial direction A (opposite to the first axial side A1 in the axial direction A) is defined as a second axial side A2. The first axial side A1 is a side where the rotary electric machine 1 is disposed with respect to the transmission mechanism 3 in the axial direction A. As shown in FIG. 3, the first output member 61 is the output member 6 disposed on the first axial side A1 out of the pair of output members 6, and the second output member 62 is the output member 6 disposed on the second axial side A2 out of the pair of output members 6.

As shown in FIG. 1, in the present embodiment, the vehicle drive device 100 is mounted on the vehicle 200 with the first axial side A1 being a right side of the vehicle and the second axial side A2 being a left side of the vehicle. Therefore, the first wheel W1 to which the first output member 61 is drivingly connected is a right wheel, and the second wheel W2 to which the second output member 62 is drivingly connected is a left wheel. In FIG. 1, it is assumed that the vehicle drive device 100 is a drive device of front-wheel drive that drives a pair of right and left front wheels. Therefore, in the example shown in FIG. 1, the first wheel W1 is the right front wheel, and the second wheel W2 is the left front wheel.

As shown in FIG. 3, the rotary electric machine 1 includes a rotor 10 and a stator 11. The stator 11 is fixed to the case 2, and the rotor 10 is supported by the case 2 so as to be rotatable relative to the stator 11. In the present embodiment, the stator 11 is fixed to the case 2 by using fastening members 14 such as fastening bolts. In the present embodiment, the rotary electric machine 1 is an inner rotor type rotary electric machine, and the rotor 10 is disposed on a radially inner side of the stator 11 so as to overlap the stator 11 in a radial view along a radial direction. The radial direction is a radial direction with respect to the first axis C1, in other words, a radial direction with respect to the rotation axis of the rotary electric machine 1.

The stator 11 includes a stator core 12 and coil end portions 13 protruding in the axial direction A from the stator core 12. A coil is wound around the stator core 12, and a portion of the coil protruding in the axial direction A from the stator core 12 forms the coil end portion 13. The coil end portions 13 are formed on both sides in the axial direction A with respect to the stator core 12. As shown in FIG. 5, in the present embodiment, the stator core 12 includes a body 12a having a cylindrical shape extending in the axial direction A, and protruding portions 12b formed so as to protrude outward in the radial direction (radial direction with respect to the first axis C1) from the body 12a. The protruding portions 12b have insertion holes through which the fastening members 14 for fixing the stator core 12 to the case 2 are inserted.

As shown in FIG. 3, the transmission mechanism 3 includes an input member 16 drivingly connected to the rotary electric machine 1 coaxially with the rotary electric machine 1 (that is, on the first axis C1). In the present embodiment, the input member 16 is connected to the rotor 10 so as to rotate integrally with the rotor 10. In the example shown in FIG. 3, the vehicle drive device 100 includes a rotor shaft 15 to which the rotor 10 is fixed, and the input member 16 is connected to the rotor shaft 15 so as to rotate integrally with the rotor shaft 15. Specifically, a part of the input member 16 on the first axial side A1 is connected (in this case, spline-connected) to a part of the rotor shaft 15 on the second axial side A2. Unlike such a configuration, the configuration may be such that the vehicle drive device 100 does not include the rotor shaft 15 and the rotor 10 is fixed to the input member 16 (specifically, the part of the input member 16 on the first axial side A1).

As shown in FIG. 3, the transmission mechanism 3 includes a differential gear mechanism 5 in the present embodiment. The differential gear mechanism 5 distributes the driving force transmitted from the rotary electric machine 1 side to the pair of output members 6. In the present embodiment, the differential gear mechanism 5 is disposed coaxially with the pair of output members 6 (that is, on the second axis C2), and distributes, to the pair of output members 6, the driving force transmitted from the rotary electric machine 1 side to the output gear 30. That is, in the present embodiment, the output gear 30 is drivingly connected to both of the pair of output members 6 via the differential gear mechanism 5. In the present embodiment, the differential gear mechanism 5 is a bevel gear type differential gear mechanism, and the output gear 30 is connected to a differential case 50 of the differential gear mechanism 5 so as to rotate integrally with the differential case 50. The differential case 50 houses a first side gear 51 and a second side gear 52. The differential gear mechanism 5 distributes rotation of the output gear 30 to the first side gear 51 and the second side gear 52. The differential gear mechanism 5 is disposed on the second axial side A2 with respect to the rotary electric machine 1.

The first side gear 51 rotates integrally with the first output member 61, and the second side gear 52 rotates integrally with the second output member 62. In the present embodiment, the first side gear 51 is formed on a member different from the member that constitutes the first output member 61 (in this case, a shaft member), and is connected (in this case, spline-connected) to the first output member 61 so as to rotate integrally with the first output member 61. At least a part of the first output member 61 on the first axial side A1 has a tubular shape (specifically, a cylindrical shape) extending in the axial direction A, and the first drive shaft 63 (see FIG. 1) is inserted from the first axial side A1 into the first output member 61 (space surrounded by an inner peripheral surface). In the present embodiment, the second side gear 52 is formed on a member that constitutes the second output member 62 (in this case, a shaft member). Specifically, the second side gear 52 is formed at an end of the second output member 62 on the first axial side A1. At least a part of the second output member 62 on the second axial side A2 has a tubular shape (specifically, a cylindrical shape) extending in the axial direction A, and the second drive shaft 64 (see FIG. 1) is inserted from the second axial side A2 into the second output member 62 (space surrounded by an inner peripheral surface).

As shown in FIG. 3, in the present embodiment, the transmission mechanism 3 includes a counter gear mechanism 4 disposed on a different axis from those of the rotary electric machine 1 and the output gear 30 in a power transmission path between the rotary electric machine 1 and the output gear 30. The counter gear mechanism 4 is disposed on a third axis C3 different from the first axis C1 and the second axis C2. The third axis C3 is parallel to the first axis C1 and the second axis C2. In the present embodiment, the counter gear mechanism 4 includes a counter input gear 40a that meshes with an input gear 17 that rotates integrally with the input member 16, a counter output gear 40b that meshes with the output gear 30, and a counter shaft 40 that connects the counter input gear 40a and the counter output gear 40b. The input gear 17 is disposed on the second axial side A2 with respect to the rotary electric machine 1, and the counter gear mechanism 4 is disposed on the second axial side A2 with respect to the rotary electric machine 1. In the present embodiment, the counter input gear 40a is disposed on the second axial side A2 with respect to the counter output gear 40b.

In the present embodiment, the counter input gear 40a has a larger diameter than the input gear 17, and the counter output gear 40*b* has a smaller diameter than the output gear 30. Therefore, the speed of rotation of the input member 16 is reduced based on a gear ratio between the input gear 17 and the counter input gear 40*a*, and is further reduced based on a gear ratio between the counter output gear 40*b* and the output gear 30 (that is, reduced in two stages). Thus, the rotation is transmitted to the output gear 30.

As shown in FIGS. 2 and 3, the case 2 includes a first case portion 21, a second case portion 22, and a third case portion 23 in the present embodiment. The second case portion 22 is joined to the second axial side A2 of the first case portion 21, and the third case portion 23 is joined to the first axial side A1 of the first case portion 21. The rotary electric machine 1 is housed in a space surrounded by the first case portion 21 and the third case portion 23, and the transmission mechanism 3 is housed in a space surrounded by the first case portion 21 and the second case portion 22. In this way, the case 2 includes a rotary electric machine housing chamber S1 that houses the rotary electric machine 1. The case 2 further includes a transmission mechanism housing chamber S3 that houses the transmission mechanism 3. The housing chamber forms a housing space that houses an object to be housed. At least one of the pair of output members 6 is disposed in a space communicating with the rotary electric machine housing chamber S1. In the present embodiment, the first output member 61 is housed in the space communicating with the rotary electric machine housing chamber S1. Specifically, at least a part of the first output member 61 that overlaps the rotary electric machine 1 in the axial direction A (overlapping part in a disposition area in the axial direction A) is housed in the space communicating with the rotary electric machine housing chamber S1. In this way, in the present embodiment, the rotary electric machine 1 and the first output member 61 are housed in a common housing chamber (specifically, a housing chamber including the rotary electric machine housing chamber S1) of the case 2.

In the present embodiment, the case 2 further includes an inverter housing chamber S2 that houses the inverter device 90. Specifically, the case 2 includes a fourth case portion 24 joined to the first case portion 21, and the inverter device 90 is housed in a space surrounded by the first case portion 21 and the fourth case portion 24 (inverter housing chamber S2). The inverter device 90 is housed in the inverter housing chamber S2 while being fixed to the case 2 with bolts or the like. In the present embodiment, the inverter housing chamber S2 is formed in the first case portion 21 so as to be open to a first-direction first side X1 (see FIG. 2) described later, and the fourth case portion 24 is joined to the first case portion 21 so as to close the opening. Although details are omitted, the inverter device 90 includes a switching element unit (power module) including a plurality of switching elements constituting an inverter circuit, a control board on which a control device for controlling the inverter circuit is mounted, and a smoothing capacitor for smoothing a voltage between positive and negative electrodes on a direct current side of the inverter circuit. The switching element unit, the control board, and the smoothing capacitor are housed in the inverter housing chamber S2. Thus, in the present embodiment, the rotary electric machine housing chamber S1 and the inverter housing chamber S2 are integrally formed in the single case 2.

As shown in FIG. 3, the case 2 includes a partition wall 25 (demarcation wall) that demarcates the rotary electric machine housing chamber S1 and the inverter housing chamber S2. In the present embodiment, the rotary electric machine housing chamber S1 and the inverter housing chamber S2 are formed integrally in the case 2 (in this case, the first case portion 21). Specifically, the rotary electric machine housing chamber S1 and the inverter housing chamber S2 are formed in one member (for example, one member formed by die casting and made of a common material). In the present embodiment, the rotary electric machine housing chamber S1 and the inverter housing chamber S2 are demarcated by one partition wall 25.

Figure 4:
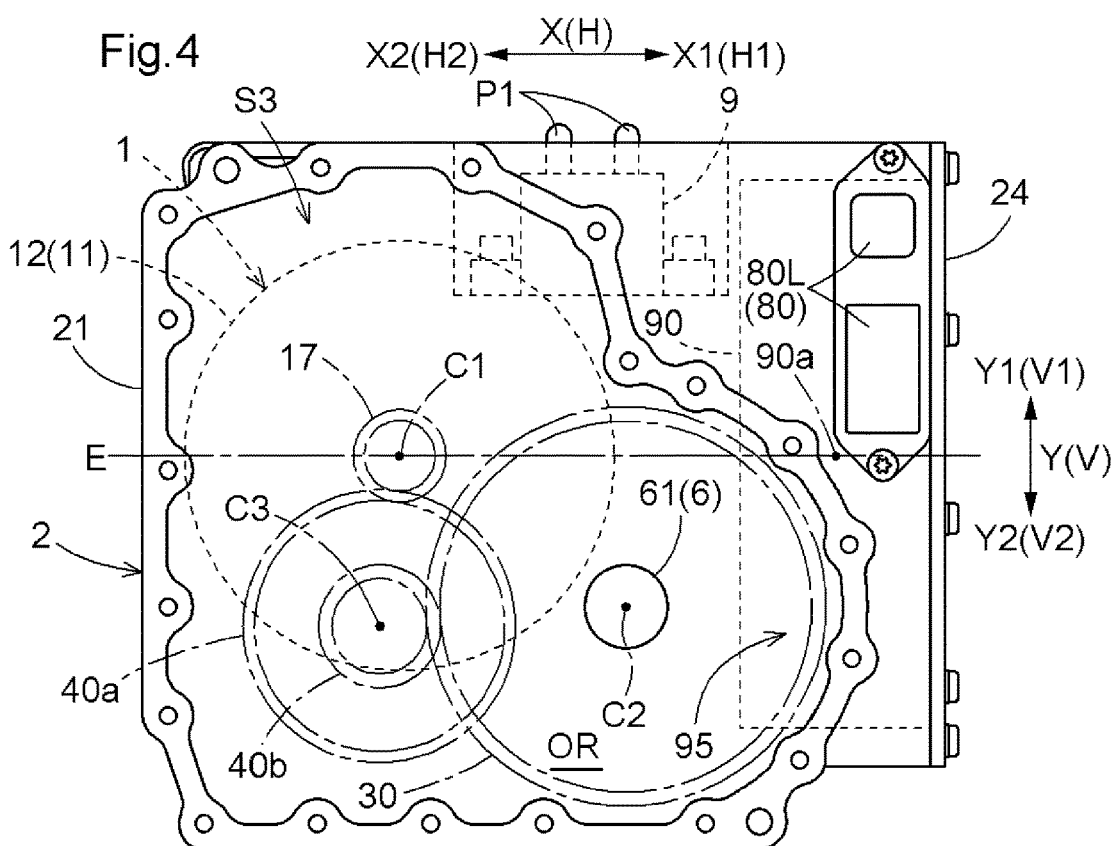
FIG. 4 is a diagram showing a disposition relationship of components of the vehicle drive device according to the embodiment in an axial view.
Figure 6:
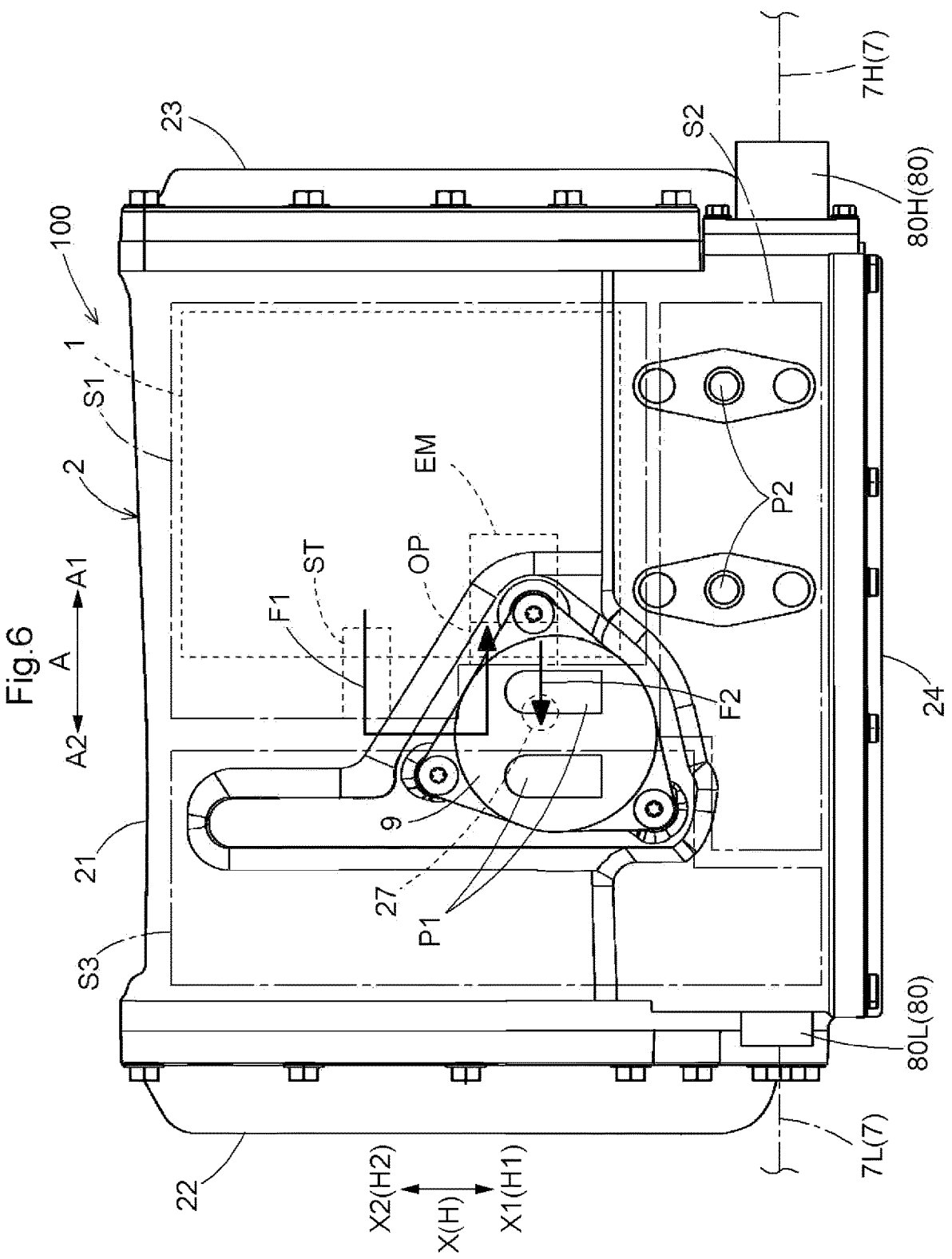
FIG. 6 is a plan view of the vehicle drive device according to the embodiment.

As shown in FIG. 2, in the present embodiment, the case 2 is provided with connectors 80 for electrically connecting cables 7 (see FIG. 6) disposed outside the case 2 and the inverter device 90. FIG. 6 simply shows the cables 7. As shown in FIGS. 4 to 6, the connectors 80 include a low-voltage connector 80L and a high-voltage connector 80H that relays electric power at a voltage higher than that of the low-voltage connector 80L. A power supply line (example of a low-voltage cable 7L) for supplying electric power to the control board of the inverter device 90 and a signal line (example of the low-voltage cable 7L) for transmitting a control signal to the control board are connected to the low-voltage connector 80L. A power supply line (example of a high-voltage cable 7H) for supplying electric power to the inverter circuit of the inverter device 90 is connected to the high-voltage connector 80H.

As shown in FIG. 4, in the axial view along the axial direction A (in other words, the axial view along the second axis C2), a direction in which the rotary electric machine 1 and the inverter device 90 are arranged is defined as a first direction X, and a direction orthogonal to both the axial direction A and the first direction X is defined as a second direction Y. In the present embodiment, the first direction X is identical to a width direction H described later, and the second direction Y is identical to the up-down direction V. One side in the first direction X is defined as the first-direction first side X1, and the other side in the first direction X (opposite to the first-direction first side X1 in the first direction X) is defined as a first-direction second side X2. One side in the second direction Y is defined as a second-direction first side Y1, and the other side in the second direction Y (opposite to the second-direction first side Y1 in the second direction Y) is defined as a second-direction second side Y2. The first-direction first side X1 is a side where the inverter device 90 is disposed with respect to the rotary electric machine 1 in the first direction X. In FIG. 4, the outer peripheral surface of the stator core 12 (specifically, the body 12*a* described above) is represented by a dashed line, the root circle and the tip circle of each gear are represented by long dashed short dashed lines, and the outer peripheral surface of the first output member 61 (specifically, the outer peripheral surface of a part of the first output member 61 that is interposed between the rotary electric machine 1 and the inverter device 90 in the first direction X) is represented by a continuous line.

In the present embodiment, the vehicle drive device 100 is mounted on the vehicle 200 with the second-direction first side Y1 being the upper side V1 and the second-direction second side Y2 being the lower side V2. In the present embodiment, the vehicle drive device 100 is mounted on the vehicle 200 with the first-direction second side X2 being a front side L1 (front side in a vehicle front-rear direction L) and the first-direction first side X1 being a rear side L2 (rear side in the vehicle front-rear direction L). As shown in FIG. 1, in the present embodiment, the vehicle drive device 100 is mounted on the front side L1 of a central portion of the vehicle 200 in the vehicle front-rear direction L. Therefore, the first-direction first side X1 that is the side where the inverter device 90 is disposed with respect to the rotary electric machine 1 in the first direction X and is the rear side L2 in the present embodiment is close to the center in the vehicle front-rear direction L. Therefore, in the present embodiment, the inverter device 90 is disposed closer to the center in the vehicle front-rear direction L than the rotary electric machine 1 in the vehicle-mounted state. When the vehicle drive device 100 is mounted on the rear side L2 of the central portion of the vehicle 200 in the vehicle front-rear direction L, the vehicle drive device 100 is mounted on the vehicle 200 with the first-direction second side X2 being the rear side L2 and the first-direction first side X1 being the front side L1. Thus, the inverter device 90 can be disposed closer to the center in the vehicle front-rear direction L than the rotary electric machine 1. In this way, when the vehicle drive device 100 is mounted on the rear side L2 of the central portion of the vehicle 200 in the vehicle front-rear direction L, the pair of wheels W to be driven by the vehicle drive device 100 is, for example, a pair of right and left rear wheels.

When the vehicle 200 includes the pair of right and left front wheels and the pair of right and left rear wheels, one of the pair of right and left front wheels and the pair of right and left rear wheels that is not driven by the vehicle drive device 100 (pair of right and left rear wheels in the example shown in FIG. 1) may be driven by a drive device other than the vehicle drive device 100. The drive device other than the vehicle drive device 100 is, for example, a drive device configured to transmit an output torque of an internal combustion engine (example of a driving force source other than the rotary electric machine) to a pair of wheels to be driven, a drive device configured to transmit an output torque of a rotary electric machine (rotary electric machine different from the rotary electric machine 1 of the vehicle drive device 100) to the pair of wheels to be driven, or a drive device configured to transmit the output torques of both the internal combustion engine and the rotary electric machine (rotary electric machine different from the rotary electric machine 1 of the vehicle drive device 100) to the pair of wheels to be driven. The drive device other than the vehicle drive device 100 may be a drive device having the same configuration as that of the vehicle drive device 100.

The width direction H is defined as a direction orthogonal to the first axis C1 in an up-down view along the up-down direction V. In the present embodiment, the width direction H is defined as a horizontal direction orthogonal to the first axis C1 (that is, a direction orthogonal to the axial direction A and the up-down direction V). As shown in FIG. 4, in the present embodiment, the rotary electric machine 1 and the inverter device 90 are disposed so that their disposition areas in the up-down direction V overlap each other. Therefore, the width direction H can be defined as the first direction X as an example. In this case, the second direction Y is parallel to the up-down direction V as shown in FIG. 4. As another example, a direction along an imaginary straight line E passing through the first axis C1 and a center 90a of the inverter device 90 in the axial view may be defined as the first direction X. The center 90a of the inverter device 90 in the axial view can be the center of gravity of a figure defining the outer shape (outer edge) of the inverter device 90 in the axial view. In the example shown in FIG. 4, the figure defining the outer shape of the inverter device 90 in the axial view is a figure having a rectangular shape (in this case, a rectangular shape elongated in the second direction Y, in other words, a rectangular shape elongated in the up-down direction V). The center of gravity of the rectangular shape (specifically, an intersection of diagonal lines) can be the center 90a of the inverter device 90 in the axial view. In the example shown in FIG. 4, the width direction H and the direction along the imaginary straight line E in the axial view are parallel to each other. That is, in the example shown in FIG. 4, the first direction X is defined as the same direction by either of the above two definitions. One side in the width direction H (in the present embodiment, agrees with the first-direction first side X1) is defined as a first widthwise side H1, and a side opposite to the first widthwise side H1 (in the present embodiment, agrees with the first-direction second side X2) is defined as a second widthwise side H2.

As shown in FIG. 4, in the present embodiment, the first output member 61 is interposed between the rotary electric machine 1 and the inverter device 90 in the first direction X at a position in the second direction Y where both the rotary electric machine 1 and the inverter device 90 are disposed. The part of the first output member 61 interposed between the rotary electric machine 1 and the inverter device 90 in the first direction X is disposed so that the disposition area in the axial direction A overlaps the rotary electric machine 1 and also overlaps the inverter device 90 (see FIG. 3). As shown in FIG. 4, the output gear 30 is disposed so as to overlap the rotary electric machine 1 and the inverter device 90 in the axial view. Specifically, the output gear 30 is disposed so that a part of the output gear 30 on the first-direction second side X2 overlaps the rotary electric machine 1 in the axial view and a part of the output gear 30 on the first-direction first side X1 overlaps the inverter device 90 in the axial view. As shown in FIG. 3, the output gear 30 is disposed on one side in the axial direction A (specifically, the second axial side A2) with respect to the rotary electric machine 1 and the inverter device 90. The rotary electric machine 1 and the inverter device 90 are disposed so that their disposition areas in the axial direction A overlap each other. In the present embodiment, at least a part of the inverter device 90 (only a part in the example shown in FIG. 4) is disposed on the lower side V2 of the second axis C2 in the vehicle-mounted state. The entire inverter device 90 may be disposed on the upper side V1 of the second axis C2 in the vehicle-mounted state.

As described above, in the present embodiment, the output gear 30 is disposed so as to overlap the rotary electric machine 1 and the inverter device 90 in the axial view. Therefore, as shown in FIGS. 4 and 5, the inverter device 90 includes an overlapping portion 95 disposed so as to overlap the output gear 30 in the axial view. The connectors 80 (specifically, the low-voltage connector 80L and the high-voltage connector 80H) are disposed in an area of the case 2 that is on the upper side V1 of the overlapping portion 95 (in other words, a part of the case 2 that overlaps the overlapping portion 95 in the axial view) and overlaps the inverter device 90 in the axial view (hereinafter referred to as "target area"). As shown in FIG. 2, the connectors 80 are disposed on the end faces of the case 2 in the axial direction A.

As shown in FIG. 4, in the present embodiment, the inverter device 90 is disposed, for example, over a range in the up-down direction V from the lower side V2 of the second axis C2 to the upper side V1 of the upper end of the output gear 30. Since the inverter device 90 is disposed in this way, a part on the upper side V1 of the overlapping portion 95 in the area of the case 2 that overlaps the inverter device 90 in the axial view is likely to be a dead space. Since the connector 80 is disposed in the target area in the vehicle drive device 100, the connector 80 can be disposed by effectively using the area that is likely to be the dead space.

As shown in FIGS. 4 to 6, in the present embodiment, the low-voltage connector 80L and the high-voltage connector 80H are disposed, for example, opposite to each other in the axial direction A across the inverter device 90. Specifically, the low-voltage connector 80L is disposed on the end face of the case 2 on the second axial side A2 (see FIG. 2), and the high-voltage connector 80H is disposed on the end face of the case 2 on the first axial side A1. When the low-voltage connector 80L and the high-voltage connector 80H are disposed on the same side in the axial direction A with respect to the inverter device 90 unlike such a configuration, the distance between the low-voltage connector 80L and the high-voltage connector 80H is likely to be short, and noise may be put on a voltage (for example, a control signal) relayed by the low-voltage connector 80L due to influence of a voltage relayed by the high-voltage connector 80H. By disposing the low-voltage connector 80L and the high-voltage connector 80H opposite to each other in the axial direction A across the inverter device 90 as described above, a long distance can be secured between the low-voltage connector 80L and the high-voltage connector 80H. Thus, the above noise problem is less likely to occur.

In the present embodiment, the connectors 80 are disposed on the end faces of the case 2 in the axial direction A, and the vehicle drive device 100 is mounted on the vehicle 200 with the axial direction A along the vehicle right-left direction. By disposing the connector 80 on the end face of the case 2 in the vehicle right-left direction (right side or left side) in this way instead of the end face of the case 2 in the vehicle front-rear direction L (front side L1 or rear side L2) or the end face of the case 2 on the lower side V2, the connector 80 can be disposed at a position where it is less likely to be affected by a collision load in the event of collision of the vehicle 200. For example, when the vehicle drive device 100 is mounted in the rear part of the vehicle 200, mounting restrictions in the up-down direction V are likely to be strict. By disposing the connector 80 on the end face of the case 2 in the vehicle right-left direction (right side or left side) instead of the end face of the case 2 on the upper side V1, the dimension of the vehicle drive device 100 in the up-down direction V can be reduced and the mountability of the vehicle drive device 100 on the vehicle 200 can be secured easily.

As shown in FIG. 4, the first axis C1 that is the rotation axis of the rotary electric machine 1, the second axis C2 that is the rotation axis of the output gear 30 (in other words, the rotation axis of the pair of output members 6), and the third axis C3 that is the rotation axis of the counter gear mechanism 4 are located within the disposition area of the inverter device 90 in the up-down direction V. In the present embodiment, the third axis C3 is located opposite to the inverter device 90 in the first direction X (that is, on the first-direction second side X2) with respect to the second axis C2 in the axial view. In the present embodiment, the third axis C3 is also located on the first-direction second side X2 with respect to the first axis C1 in the axial view. In the present embodiment, the second axis C2 and the third axis C3 are located on the same side in the second direction Y (in this case, the second-direction second side Y2) with respect to the first axis C1 in the axial view. That is, the second axis C2 is located on the second-direction second side Y2 with respect to the first axis C1 in the axial view. In the vehicle-mounted state, the second axis C2 is located on the lower side V2 with respect to the imaginary straight line E in the axial view. The third axis C3 is located on the second-direction second side Y2 with respect to the first axis C1 in the axial view. In the vehicle-mounted state, the third axis C3 is located on the lower side V2 with respect to the imaginary straight line E in the axial view. In the present embodiment, the third axis C3 is located opposite to the center 90a of the inverter device 90 with respect to an imaginary straight line passing through the first axis C1 and the second axis C2 in the axial view.

In the example shown in FIG. 4, in the area in the up-down direction V where both the second axis C2 and the inverter device 90 are located, the second axis C2 is located on the second widthwise side H2 with respect to the inverter device 90. The end of the rotary electric machine 1 on the second widthwise side H2 is located on the second widthwise side H2 of the second axis C2. The third axis C3 is located on the first widthwise side H1 of the end of the rotary electric machine 1 (for example, the stator core 12 or the body 12a) on the second widthwise side H2. Since the second axis C2 and the third axis C3 are located in this way, the output gear 30 and the counter gear mechanism 4 can be disposed so that the entire or major parts thereof fit in the space in the width direction H between the end of the rotary electric machine 1 on the second widthwise side H2 and the inverter device 90. Therefore, the vehicle drive device 100 can be downsized in the width direction H. In the example shown in FIG. 4, the entire output gear 30 and the entire counter gear mechanism 4 are disposed in the space in the width direction H between the end of the rotary electric machine 1 on the second widthwise side H2 and the end of the inverter device 90 on the first widthwise side H1.

In the example shown in FIG. 4, the third axis C3 is located on the second widthwise side H2 of the second axis C2. The rotary electric machine 1 (specifically, the stator core 12) has a larger diameter than the counter gear mechanism 4, and the first axis C1 is located on the first widthwise side H1 of the third axis C3. The entire counter gear mechanism 4 is disposed on the first widthwise side H1 of the end of the rotary electric machine 1 (for example, the stator core 12 or the body 12a) on the second widthwise side H2. By disposing the rotary electric machine 1 and the counter gear mechanism 4 in this way, the rotary electric machine 1 can be disposed closer to the inverter device 90 in the width direction H within a range in which the counter gear mechanism 4 does not protrude from the rotary electric machine 1 to the second widthwise side H2. Therefore, the vehicle drive device 100 can be downsized in the width direction H. In the example shown in FIG. 4, the first axis C1 is located on the second widthwise side H2 of the second axis C2.

In the example shown in FIG. 4, the second axis C2 and the third axis C3 are located on the lower side V2 of the first axis C1. As described later, an oil storage space OR for storing oil (lubricating or cooling oil) is formed in the lower part of the case 2 (see FIG. 4). When the second axis C2 and the third axis C3 are located in this way, the oil stored in the oil storage space OR can be raked up by both the output gear 30 disposed on the second axis C2 and the gear disposed on the third axis C3 (in this example, the counter input gear 40a). Therefore, the lubricating performance and the cooling performance can be improved. In the example shown in FIG. 4, the lower end of the output gear 30 is located on the lower side V2 of both the lower end of the rotary electric machine 1 and the lower end of the counter gear mechanism 4. Thus, the oil can efficiently be raked up by the output gear 30.

In the example shown in FIG. 4, the inverter device 90 is disposed over a range in the up-down direction V from the lower side V2 of the second axis C2 to the upper side V1 of the upper end of the rotary electric machine 1 (for example, the stator core 12 or the body 12a). When the inverter device 90 is disposed in this way, the rotary electric machine 1 can be disposed so that the entire or major part thereof fits in the disposition area of the inverter device 90 in the up-down direction V. Therefore, the vehicle drive device 100 can be downsized in the up-down direction V.

As shown in FIG. 5, the case 2 includes the oil storage space OR provided in the lower part of the rotary electric machine housing chamber S1. The oil storage space OR is a space for storing oil in the rotary electric machine housing chamber S1. For example, a part of the rotary electric machine housing chamber S1 that may be on the lower side V2 of an oil level OL (in other words, a part of the rotary electric machine housing chamber S1 on the lower side V2 of the highest oil level OL in a range of change in the oil level OL) can be defined as the oil storage space OR. The oil storage space OR may be provided on the lower side V2 of the rotary electric machine 1, or may be provided so that a part of the rotary electric machine 1 is immersed in the oil. In the present embodiment, the oil storage space OR is provided so that at least the lowest oil level OL in the range of change in the oil level OL is on the lower side V2 of the rotary electric machine 1. The oil storage space OR is provided at least in the rotary electric machine housing chamber S1. In the present embodiment, as shown in FIG. 4, the oil storage space OR is also provided in the transmission mechanism housing chamber S3 (specifically, a lower part of the transmission mechanism housing chamber S3). That is, the oil storage space OR is provided over both the rotary electric machine housing chamber S1 and the transmission mechanism housing chamber S3. Although illustration is omitted, a communication hole that communicates the rotary electric machine housing chamber S1 and the transmission mechanism housing chamber S3 is formed in an intermediate wall 28 (see FIG. 3) that demarcates the rotary electric machine housing chamber S1 and the transmission mechanism housing chamber S3. The oil can flow between the rotary electric machine housing chamber S1 and the transmission mechanism housing chamber S3 via the communication hole. By providing the oil storage space OR over both the rotary electric machine housing chamber S1 and the transmission mechanism housing chamber S3 in this way, a sufficient amount of oil can easily be secured in the case 2 while avoiding an excessive increase in the oil level in the oil storage space OR. Therefore, the amount of oil necessary for lubrication or cooling can appropriately be supplied to each part of the vehicle drive device 100 while suppressing agitation of the oil by the gears constituting the transmission mechanism 3 to reduce the loss of the driving force due to the agitation of the oil.

As shown in FIG. 5, an oil pump OP that supplies cooling oil to the rotary electric machine 1 is disposed in the oil storage space OR inside the case 2 (specifically, in the oil storage space OR in the lower part of the rotary electric machine housing chamber S1). The phrase "in the oil storage space OR" regarding disposition of a certain member means that at least a part of the member is disposed in the oil storage space OR. The oil pump OP sucks the oil stored in the oil storage space OR. The oil pump OP supplies the cooling oil to at least the rotary electric machine 1 (specifically, a cooling target portion such as the coil end portion 13). The oil pump OP may further supply lubricating oil to gears, bearings, and the like. As shown in FIG. 6, in the present embodiment, the oil pump OP is an electric oil pump to be driven by a dedicated electric motor EM. Specifically, the oil pump OP includes a pump unit having a pump chamber, and a pump rotor housed in the pump unit is driven by the electric motor EM. In addition to the pump unit, the electric motor EM may be regarded as a component of the oil pump OP. The electric motor EM is disposed in the oil storage space OR similarly to the oil pump OP. As shown in FIG. 5, the electric motor EM includes a cover CV, and the cover CV is disposed in the oil storage space OR. The electric motor EM includes a housing that forms a housing space for a rotor and a stator, and the cover CV constitutes at least a part of the housing. The cover CV is, for example, a member that forms a peripheral wall of the housing, or a member that forms an end wall of the housing (for example, an end wall on the first axial side A1).

As shown in FIG. 5, the oil pump OP is disposed in the oil storage space OR so as to overlap the output gear 30 in the axial view. Specifically, the oil pump OP is disposed in the oil storage space OR at a position on the lower side V2 of the first axis C1 and the second axis C2 so as to overlap the output gear 30 in the axial view. By disposing the oil pump OP in this way, the space in the oil storage space OR that overlaps the output gear 30 in the axial view is effectively used as the disposition space of the oil pump OP. Thus, the vehicle drive device 100 can be downsized. It is preferable that the entire or major part of the oil pump OP be disposed so as to overlap the output gear 30 in the axial view. The oil pump OP is disposed so as not to overlap the rotary electric machine 1 in the axial view.

As shown in FIG. 5, the vehicle drive device 100 further includes a strainer ST that strains the oil sucked by the oil pump OP. In the present embodiment, the second axis C2 and the oil pump OP are located on the first widthwise side H1 with respect to the first axis C1. As shown in FIGS. 5 and 6, the strainer ST is disposed in the oil storage space OR at a position on the lower side V2 of the rotary electric machine 1 and on the second widthwise side H2 of the oil pump OP so as to overlap the rotary electric machine 1 in the up-down view. In this example, as shown in FIG. 5, the strainer ST is disposed at a position where it overlaps the rotation axis of the rotary electric machine 1 (first axis C1) in the up-down view. In this example, as shown in FIG. 6, a part of the strainer ST on the first axial side A1 is disposed so as to overlap a part of the rotary electric machine 1 on the second axial side A2 in the up-down view.

As shown in FIG. 5, in the present embodiment, the entire disposition area of the oil pump OP in the up-down direction V fits in the disposition area of the output gear 30 in the up-down direction V. In the present embodiment, the disposition area of the oil pump OP in the up-down direction V overlaps the disposition area of the inverter device 90 in the up-down direction V. In the example shown in FIG. 5, a part of the oil pump OP on the upper side V1 and a part of the inverter device 90 on the lower side V2 are disposed in the same area in the up-down direction V.

In the example shown in FIG. 5, the oil pump OP is disposed on the lower side V2 of the first axis C1 and the second axis C2 between the first axis C1 and the second axis C2 in the width direction H. By disposing the oil pump OP between the first axis C1 and the second axis C2 in the width direction H in this way, for example, the oil pump OP and the strainer ST connected thereto can be disposed at or near the central part in the width direction H where the occurrence of air suction can be reduced easily. By disposing the oil pump OP on the lower side V2 of the first axis C1 and the second axis C2, the oil pump OP is disposed near the oil storage space OR formed in the lower part of the case 2. Thus, it is easier to reduce oil suction resistance.

In the example shown in FIGS. 4 to 6, the oil discharged from the oil pump OP is supplied to the rotary electric machine 1 through an oil cooler 9 (see FIGS. 4 and 6). The oil cooler 9 cools the oil by heat exchange between the oil and a refrigerant. In this example, the oil cooler 9 is a water-cooled oil cooler that uses a coolant as the refrigerant. As shown in FIGS. 4 and 6, the oil cooler 9 is provided with a first connection port P1 for introducing the coolant into the oil cooler 9, and a first connection port P1 for discharging the coolant from the oil cooler 9.

In this example, the first connection ports P1 are disposed on the outer surface of the case 2 on the upper side V1. In this example, the inverter device 90 is provided with a coolant channel for cooling the inverter device 90. As shown in FIG. 6, a second connection port P2 for introducing the coolant into the coolant channel and a second connection port P2 for discharging the coolant from the coolant channel are disposed on the outer surface of the case 2 on the upper side V1. By disposing the first connection ports P1 and the second connection ports P2 on the same outer surface (outer surface on the same side) of the case 2 in this way, an operation for connecting piping members (hoses etc.) to the first connection ports P1 and the second connection ports P2 is facilitated. Further, the cost can be reduced by reducing the lengths of the piping members.

In the example shown in FIG. 6, the oil cooler 9 is disposed across the boundary between the rotary electric machine housing chamber S1 and the transmission mechanism housing chamber S3 in a plan view (view along the up-down direction V). In this example, the outer surface of the case 2 on the upper side V1 has a recess that recedes to the lower side V2. This recess is formed by using an empty space in the internal space of the case 2, and the oil cooler 9 is disposed in this recess (see FIG. 4). Therefore, the oil cooler 9 is disposed between the rotary electric machine housing chamber S1 (specifically, a part of the rotary electric machine housing chamber S1 on the first axial side A1 with respect to the recess) and the transmission mechanism housing chamber S3 (specifically, a part of the transmission mechanism housing chamber S3 on the second axial side A2 with respect to the recess) in the axial direction A. Thus, in the present embodiment, the second axis C2 is located on the lower side V2 of the first axis C1, and the oil cooler 9 is disposed on the upper side V1 of the output gear 30 so as to overlap the transmission mechanism housing chamber S3 in the up-down view. The oil cooler 9 is also disposed so as to overlap the rotary electric machine housing chamber S1 in the up-down view.

By disposing the oil cooler 9 with the empty space as described above, an increase in the size of the vehicle drive device 100 can be suppressed. In consideration of inclination of the oil surface in the oil storage space OR formed in the lower part of the case 2 when the vehicle 200 is traveling, the oil pump OP and the strainer ST are often disposed at or near the central part in the axial direction A as in the example shown in FIG. 6. By disposing the oil cooler 9 between the rotary electric machine housing chamber S1 and the transmission mechanism housing chamber S3 in the axial direction A as described above, the oil cooler 9 and the set of the oil pump OP and the strainer ST can be disposed at the same position or close positions in the axial direction A. Thus, complication of oil passages can be suppressed. In the example shown in FIG. 4, the oil cooler 9 is disposed between the first axis C1 and the inverter device 90 in the width direction H. In the present embodiment, as shown in FIG. 6, the oil cooler 9 is disposed so as to overlap the oil pump OP in the up-down view. A part of the oil cooler 9 on the first axial side A1 is disposed so as to overlap a part of the oil pump OP on the second axial side A2 in the up-down view. In FIG. 6, a flow of the oil from the oil storage space OR to the oil pump OP via the strainer ST is schematically represented by an arrow F1, and a flow of the oil from the oil pump OP to the oil cooler 9 is schematically represented by an arrow F2. As understood from FIG. 6, in the present embodiment, an oil passage connecting the strainer ST and the oil pump OP is formed inside or outside the intermediate wall 28 (see FIG. 3) by using the intermediate wall 28, and an oil passage 27 extending in the up-down direction V so as to connect the oil pump OP and the oil cooler 9 is formed inside or outside the intermediate wall 28 by using the intermediate wall 28.

As shown in FIG. 4, in the present embodiment, the first output member 61 is disposed so as to overlap the rotary electric machine 1 in a view along the second direction Y. That is, the first output member 61 is disposed so that the disposition area in the first direction X overlaps the rotary electric machine 1. The first output member 61 is disposed so that a part of the first output member 61 on the first-direction second side X2 overlaps the rotary electric machine 1 in the view along the second direction Y. In the present embodiment, the first output member 61 is disposed so as not to overlap the inverter device 90 in the view along the second direction Y. The disposition configuration of the components shown in FIG. 4 in the axial view is an example and may be changed as appropriate. For example, the disposition configuration of FIG. 4 may be reversed in the first direction X, in the second direction Y, or in both the first direction X and the second direction Y.

As shown in FIG. 5, through holes 26 through which wiring 91 connecting the rotary electric machine 1 and the inverter device 90 is inserted are formed through the partition wall 25. FIG. 4 shows a disposition relationship of the components of the vehicle drive device 100 in the axial view when the vehicle drive device 100 is viewed from the second axial side A2. FIG. 5 shows a disposition relationship of the components of the vehicle drive device 100 in the axial view when the vehicle drive device 100 is viewed from the first axial side A1. A terminal block including terminals 93 is attached to the through holes 26. Power lines 92 drawn out from the coil end portions 13 and power supply lines (not shown) connected to the inverter device 90 are electrically connected via the terminals 93. The power supply lines, the terminals 93, and the power lines 92 constitute the wiring 91 for transmitting electric power (electric power for driving the rotary electric machine 1 and electric power generated by the rotary electric machine 1) between the rotary electric machine 1 and the inverter device 90. In the present embodiment, three power lines 92 are provided and three through holes 26 are formed in the partition wall 25 based on the fact that the number of phases of alternating current power for driving the rotary electric machine 1 is "3".

As shown in FIG. 5, in the present embodiment, the through holes 26 (in this case, all the three through holes 26) in the vehicle-mounted state are located between the rotary electric machine 1 and the inverter device 90 in the first direction X in the axial view on the upper side V1 of the second axis C2 and at a height (position in the up-down direction V) at which both the rotary electric machine 1 and the inverter device 90 are disposed. The height at which the rotary electric machine 1 is disposed includes a height at which the protruding portion 12*b* of the stator core 12 described above is disposed. In the example shown in FIG. 5, the through holes 26 (in this case, all the three through holes 26) in the vehicle-mounted state are located between the rotary electric machine 1 and the inverter device 90 in the first direction X in the axial view on the upper side V1 of the first axis C1 and at a height at which both the rotary electric machine 1 and the inverter device 90 are disposed.

In the example shown in FIG. 5, a breather chamber 8 is formed at a position where it overlaps the wiring 91 (specifically, a part of the wiring 91 that is disposed in the rotary electric machine housing chamber S1) in the axial view. The breather chamber 8 constitutes a breather device that communicates the inside and outside of the case 2. The breather chamber 8 is formed so as to be open to the rotary electric machine housing chamber S1 where the amount of oil scattering is smaller than that in the transmission mechanism housing chamber S3. The wiring 91 is disposed on the upper side V1 in the rotary electric machine housing chamber S1 in order to avoid being immersed in the oil surface to the extent possible. In general, the rotary electric machine housing chamber S1 includes an empty space formed on one side in the axial direction A with respect to the wiring 91 depending on the length of the stator core 12 in the axial direction A. In the example shown in FIG. 5, the wiring 91 is disposed at or near the end of the stator core 12 on the first axial side A1 (near side in the drawing sheet of FIG. 5). Therefore, the empty space is formed on the second axial side A2 (far side in the drawing sheet of FIG. 5) with respect to the wiring 91 depending on the length of the stator core 12 in the axial direction A. By providing the breather chamber 8 at the position where it overlaps the wiring 91 in the axial view, the breather chamber 8 can be formed at the position relatively on the upper side V1 where the oil is less likely to scatter by effectively using the empty space without the need for an additional space or while minimizing the additional space.

When the rotary electric machine 1 and the inverter device 90 are displaced in different directions, a load (for example, a tensile load) may be applied to the wiring 91 to cause a stress in the members (such as busbars) constituting the wiring 91, or a load may be applied to connection portions 94 between different members in the wiring 91 (in the example shown in FIG. 5, bolt-fastening portions between the power lines 92 and the terminals 93). The displacement of the rotary electric machine 1 and the inverter device 90 in different directions may be caused by displacement of the first axis C1 and the second axis C2 in different directions when the driving force is transmitted by the transmission mechanism 3. In this respect, in the example shown in FIG. 5, the rotary electric machine 1 is fixed to the case 2 so that the protruding portion 12b of the stator core 12 fixed to the case 2 by the fastening member 14 is disposed between the wiring 91 (specifically, the connection portions 94) and the output member 6 (specifically, the first output member 61) in the axial view. In other words, the rotary electric machine 1 is fixed to the case 2 so that the connection portions 94, the protruding portion 12b, and the first output member 61 are arranged in a straight line in the axial view. By fixing the rotary electric machine 1 to the case 2 in this way, the displacement of the first axis C1 and the second axis C2 in different directions is unlikely to occur when the driving force is transmitted by the transmission mechanism 3. Thus, a large load is unlikely to be applied to the wiring 91.

In the example shown in FIG. 5, the stator core 12 includes two protruding portions 12b in addition to the protruding portion 12b disposed between the wiring 91 and the output member 6 in the axial view. That is, the stator core 12 includes three protruding portions 12b. The three protruding portions 12b are distributed in a circumferential direction (circumferential direction with respect to the first axis C1). In the example shown in FIG. 5, the three protruding portions 12b are disposed at equal intervals along the circumferential direction. In the example shown in FIG. 5, the rotary electric machine 1 is fixed to the case 2 so that the end of the stator core 12 on the second widthwise side H2 corresponds to the end of the body 12a on the second widthwise side H2 (in other words, all the protruding portions 12b are disposed on the first widthwise side H1 of the end of the body 12a on the second widthwise side H2). Thus, the rotary electric machine 1 can be disposed while suppressing an increase in the size of the vehicle drive device 100 in the width direction H.

Other Embodiments

Next, other embodiments of the vehicle drive device will be described.

(1) In the above embodiment, description has been given of the exemplary configuration in which the entire disposition area of the oil pump OP in the up-down direction V fits in the disposition area of the output gear 30 in the up-down direction V. However, the present disclosure is not limited to such a configuration, and may employ, for example, a configuration in which a part of the oil pump OP is disposed on the lower side V2 of the output gear 30.

(2) In the above embodiment, description has been given of the exemplary configuration in which the second axis C2 and the oil pump OP are located on the first widthwise side H1 with respect to the first axis C1 and the strainer ST is disposed in the oil storage space OR at the position on the lower side V2 of the rotary electric machine 1 and on the second widthwise side H2 of the oil pump OP so as to overlap the rotary electric machine 1 in the up-down view. However, the present disclosure is not limited to such a configuration. The positional relationship in the width direction H among the first axis C1, the second axis C2, the oil pump OP, and the strainer ST may be changed as appropriate. The strainer ST may be disposed at a position where it does not overlap the rotary electric machine 1 in the up-down view (for example, at a position where the disposition area in the axial direction A does not overlap the rotary electric machine 1).

(3) In the above embodiment, description has been given of the exemplary configuration in which the disposition area of the oil pump OP in the up-down direction V overlaps the disposition area of the inverter device 90 in the up-down direction V. However, the present disclosure is not limited to such a configuration, and may employ a configuration in which the disposition area of the oil pump OP in the up-down direction V does not overlap the disposition area of the inverter device 90 in the up-down direction V (for example, the oil pump OP is disposed on the lower side V2 of the inverter device 90).

(4) In the above embodiment, description has been given of the exemplary configuration in which the oil pump OP is the electric oil pump to be driven by the dedicated electric motor EM. However, the present disclosure is not limited to such a configuration, and may employ, for example, a configuration in which the oil pump OP is driven by the driving force of the rotary electric machine 1.

(5) In the above embodiment, description has been given of the exemplary configuration in which the oil cooler 9 is disposed on the upper side V1 of the output gear 30 so as to overlap the transmission mechanism housing chamber S3 and the oil pump OP in the up-down view. However, the present disclosure is not limited to such a configuration. The positional relationship in the up-down direction V between the oil cooler 9 and the output gear 30 may be changed as appropriate. The oil cooler 9 may be disposed so as not to overlap at least one of the transmission mechanism housing chamber S3 and the oil pump OP in the up-down view.

(6) In the above embodiment, description has been given of the exemplary configuration in which the inverter device 90 includes the overlapping portion 95 disposed so as to overlap the output gear 30 in the axial view. However, the present disclosure is not limited to such a configuration, and may employ a configuration in which the inverter device 90 does not include the overlapping portion 95.

(7) In the above embodiment, description has been given of the exemplary configuration in which the inverter device 90 is housed in the case 2. However, the present disclosure is not limited to such a configuration, and may employ a configuration in which the inverter device 90 is disposed outside the case 2.

(8) In the above embodiment, description has been given of the exemplary configuration in which the transmission mechanism 3 includes the counter gear mechanism 4 in the power transmission path between the rotary electric machine 1 and the output gear 30. However, the present disclosure is not limited to such a configuration, and may employ, for example, a configuration in which an idler gear that meshes with both the input gear 17 and the output gear 30 is provided instead of the counter gear mechanism 4 or the input gear 17 and the output gear 30 mesh with each other.

(9) The configuration disclosed in each of the embodiments described above can be applied in combination with the configurations disclosed in other embodiments (including combinations of embodiments described as the other embodiments) as long as there is no contradiction. Regarding the other configurations as well, the embodiments disclosed herein are merely illustrative in all respects. Therefore, various modifications can be made as appropriate without departing from the spirit of the present disclosure.

Outline of Embodiments Described Above

Hereinafter, the outline of the vehicle drive device described above will be described.

A vehicle drive device (100) includes a rotary electric machine (1), a pair of output members (6) drivingly connected to a pair of wheels (W), a transmission mechanism (3) configured to transmit a driving force between the rotary electric machine (1) and the pair of output members (6), an oil pump (OP) configured to supply cooling oil to the rotary electric machine (1), and a case (2) that houses the rotary electric machine (1), the transmission mechanism (3), and the oil pump (OP). The rotary electric machine (1) and the pair of output members (6) are disposed separately on two parallel axes. The transmission mechanism (3) includes a differential gear mechanism (5) configured to distribute the driving force transmitted from the rotary electric machine (1) side to the pair of output members (6), and an output gear (30) drivingly connected to the pair of output members (6) coaxially with the pair of output members (6). The output gear (30) is connected to a differential case (50) of the differential gear mechanism (5) so as to rotate integrally with the differential case (50). The case (2) includes a rotary electric machine housing chamber (S1) that houses the rotary electric machine (1), and an oil storage space (OR) provided in a lower part of the rotary electric machine housing chamber (S1). At least one of the pair of output members (6) is disposed in a space that communicates with the rotary electric machine housing chamber (S1). The oil pump (OP) is disposed in the oil storage space (OR) at a position on a lower side (V2) of a first axis (C1) that is a rotation axis of the rotary electric machine (1) and a second axis (C2) that is a rotation axis of the pair of output members (6) so as to overlap the output gear (30) in an axial view along the second axis (C2).

According to this configuration, the oil pump (OP) configured to supply the oil to the rotary electric machine (1) is disposed in the oil storage space (OR) inside the case (2). Therefore, the oil pump (OP) can be protected from the outside of the vehicle drive device (100) by using the case (2). Thus, it is possible to reduce the need to separately provide a structure for protecting the oil pump (OP) from stone chippings, protruding objects on the ground, or the like, thereby easily downsizing the vehicle drive device (100).

According to this configuration, the oil pump (OP) disposed in the oil storage space (OR) as described above is disposed at the position on the lower side (V2) of the first axis (C1) and the second axis (C2) so as to overlap the output gear (30) in the axial view. Therefore, the space in the oil storage space (OR) that overlaps the output gear (30) in the axial view can effectively be used as the disposition space of the oil pump (OP). Thus, the dimension of the vehicle drive device (100) in the axial view can be reduced easily. According to this configuration, at least one of the pair of output members (6) is disposed in the space that communicates with the rotary electric machine housing chamber (S1). Therefore, the rotary electric machine (1) and the output member (6) can be disposed close to each other in the radial direction of the rotary electric machine (1) compared to a configuration in which a wall is provided between the rotary electric machine (1) and the output member (6). In this respect as well, the dimension of the vehicle drive device (100) in the axial view can be reduced easily.

As described above, with this configuration, the downsizing of the vehicle drive device (100) is facilitated when the vehicle drive device (100) includes the oil pump (OP) that supplies the oil to the rotary electric machine (1).

It is preferable that an entire disposition area of the oil pump (OP) in an up-down direction (V) fit in a disposition area of the output gear (30) in the up-down direction (V).

According to this configuration, the dimension of the vehicle drive device (100) in the up-down direction (V) can be reduced easily compared to a configuration in which a part of the oil pump (OP) protrudes to the lower side (V2) of the output gear (30).

It is preferable that the oil pump (OP) be an electric oil pump to be driven by a dedicated electric motor (EM).

When the oil pump (OP) is driven by the driving force of the rotary electric machine (1) unlike this configuration, there is a need to provide a power transmission mechanism for transmitting the driving force of the rotary electric machine (1) to the oil pump (OP). According to this configuration, there is no need to provide such a power transmission mechanism. Therefore, the vehicle drive device (100) can be downsized easily.

In the above configuration, it is preferable that the electric motor (EM) include a cover (CV), and the cover (CV) be disposed in the oil storage space (OR).

According to this configuration, the cover (CV) of the electric motor (EM) is disposed in the oil storage space (OR) inside the case (2). Therefore, the cover (CV) can be protected from the outside of the vehicle drive device (100) by using the case (2). Thus, the shape of the cover (CV) can easily be made into a simple shape such as a thin plate shape. According to this configuration, heat generated by the electric motor (EM) can be dissipated to the oil in the oil storage space (OR) via the cover (CV). Therefore, it is possible to reduce the need to provide fins or the like on the cover (CV). In this respect as well, the shape of the cover (CV) can easily be made simple. Thus, according to this configuration, the shape of the cover (CV) of the electric motor (EM) can be made simple and the vehicle drive device (100) can be downsized.

In each of the above configurations, it is preferable that an inverter device (90) housed in the case (2) and configured to control drive of the rotary electric machine (1) be further provided, the inverter device (90) include a portion (95) disposed so as to overlap the output gear (30) in the axial view, and a disposition area of the oil pump (OP) in an up-down direction (V) overlap a disposition area of the inverter device (90) in the up-down direction (V).

According to this configuration, the oil pump (OP) and the inverter device (90) can be disposed so as to overlap the output gear (30) in the axial view while their disposition areas in the up-down direction (V) overlap each other. Thus, when the vehicle drive device (100) includes the inverter device (90), the dimensions of the vehicle drive device (100) in the axial view including the dimension in the up-down direction (V) can be reduced easily.

It is preferable that the oil discharged from the oil pump (OP) be supplied to the rotary electric machine (1) through an oil cooler (9), the second axis (C2) be located on the lower side (V2) of the first axis (C1), the case (2) further include a transmission mechanism housing chamber (S3) that houses the transmission mechanism (3), and the oil cooler (9) be disposed on an upper side (V1) of the output gear (30) so as to overlap the transmission mechanism housing chamber (S3) in an up-down view.

When the second axis (C2) is located on the lower side (V2) of the first axis (C1) as in this configuration, an empty space is likely to be present in an area that is on the upper side (V1) of the output gear (30) disposed on the second axis (C2) and overlaps the transmission mechanism housing chamber (S3) in the up-down view. According to this configuration, the oil cooler (9) can be disposed by effectively using such an empty space. Thus, the dimension of the vehicle drive device (100) in the up-down direction (V) can be reduced easily.

It is preferable that the oil discharged from the oil pump (OP) be supplied to the rotary electric machine (1) through an oil cooler (9), and the oil cooler (9) be disposed so as to overlap the oil pump (OP) in an up-down view.

According to this configuration, the oil pump (OP) and the oil cooler (9) can be connected by using, for example, an oil passage extending along the up-down direction (V). In this way, the oil passage connecting the oil pump (OP) and the oil cooler (9) can be disposed easily. Further, the oil cooler (9) can easily be disposed so as to reduce the length of the oil passage connecting the oil pump (OP) and the oil cooler (9). Thus, a pressure loss in the oil passage can be reduced easily.

It is preferable that a strainer (ST) configured to strain the oil sucked by the oil pump (OP) be further provided and, assuming that a width direction (H) is a direction orthogonal to the first axis (C1) in an up-down view, a first widthwise side (H1) is one side in the width direction (H), and a second widthwise side (H2) is a side opposite to the first widthwise side (H1), the second axis (C2) and the oil pump (OP) be located on the first widthwise side (H1) with respect to the first axis (C1), and the strainer (ST) be disposed in the oil storage space (OR) at a position on the lower side (V2) of the rotary electric machine (1) and on the second widthwise side (H2) of the oil pump (OP) so as to overlap the rotary electric machine (1) in the up-down view.

In the vehicle drive device (100) of the present disclosure, the oil pump (OP) is disposed on the lower side (V2) of the first axis (C1) and the second axis (C2). Therefore, when the second axis (C2) and the oil pump (OP) are located on the first widthwise side (H1) with respect to the first axis (C1) as in this configuration, an empty space is likely to be present in an area that is in the oil storage space (OR), is on the lower side (V2) of the rotary electric machine (1) and on the second widthwise side (H2) of the oil pump (OP), and overlaps the rotary electric machine (1) in the up-down view. According to this configuration, the strainer (ST) can be disposed by effectively using such an empty space. Thus, the dimension of the vehicle drive device (100) in the up-down view can be reduced easily.

The vehicle drive device according to the present disclosure may attain at least one of the effects described above.

DESCRIPTION OF THE REFERENCE NUMERALS

1: rotary electric machine, 2: case, 3: transmission mechanism, 5: differential gear mechanism, 6: output member, 9: oil cooler, 30: output gear, 50: differential case, 90: inverter device, 95: overlapping portion (portion disposed so as to overlap output gear in axial view), 100: vehicle drive device, C1: first axis, C2: second axis, CV: cover, EM: electric motor, H: width direction, H1: first widthwise side, H2: second widthwise side, OP: oil pump, OR: oil storage space, S1: rotary electric machine housing chamber, S3: transmission mechanism housing chamber, ST: strainer, V: up-down direction, V1: upper side, V2: lower side, W: wheel

The invention claimed is:

1. A vehicle drive device comprising:
   a rotary electric machine;
   a pair of output members drivingly connected to a pair of wheels;
   a transmission mechanism configured to transmit a driving force between the rotary electric machine and the pair of output members;
   an oil pump configured to supply cooling oil to the rotary electric machine; and
   a case that houses the rotary electric machine, the transmission mechanism, and the oil pump, wherein:
   the rotary electric machine and the pair of output members are disposed separately on two parallel axes;
   the transmission mechanism includes a differential gear mechanism configured to distribute the driving force transmitted from the rotary electric machine side to the pair of output members, and an output gear drivingly connected to the pair of output members coaxially with the pair of output members;
   the output gear is connected to a differential case of the differential gear mechanism so as to rotate integrally with the differential case,
   the case includes a rotary electric machine housing chamber that houses the rotary electric machine, and an oil storage space provided in a lower part of the rotary electric machine housing chamber;
   at least one of the pair of output members is disposed in a space that communicates with the rotary electric machine housing chamber;
   the oil pump is disposed in the oil storage space at a position on a lower side of a first axis that is a rotation axis of the rotary electric machine and a second axis that is a rotation axis of the pair of output members so as to overlap the output gear in an axial view along the second axis, and the oil storage space is a common space that includes both the oil pump and the rotary electric machine.

2. The vehicle drive device according to claim 1, wherein an entire disposition area of the oil pump in an up-down direction fits in a disposition area of the output gear in the up-down direction.

3. The vehicle drive device according to claim 1, wherein the oil pump is an electric oil pump to be driven by a dedicated electric motor.

4. The vehicle drive device according to claim 3, wherein:
the electric motor includes a cover; and
the cover is disposed in the oil storage space.

5. The vehicle drive device according to claim 1, further comprising an inverter device housed in the case and configured to control drive of the rotary electric machine, wherein:
the inverter device includes a portion disposed so as to overlap the output gear in the axial view; and
a disposition area of the oil pump in an up-down direction overlaps a disposition area of the inverter device in the up-down direction.

6. The vehicle drive device according to claim 1, wherein:
the oil discharged from the oil pump is supplied to the rotary electric machine through an oil cooler;
the second axis is located on the lower side of the first axis;
the case further includes a transmission mechanism housing chamber that houses the transmission mechanism; and the oil cooler is disposed on an upper side of the output gear so as to overlap the transmission mechanism housing chamber in an up-down view.

7. The vehicle drive device according to claim 1, wherein:
the oil discharged from the oil pump is supplied to the rotary electric machine through an oil cooler; and
the oil cooler is disposed so as to overlap the oil pump in an up-down view.

8. The vehicle drive device according to claim 1, further comprising a strainer configured to strain the oil sucked by the oil pump, wherein:
assuming that a width direction is a direction orthogonal to the first axis in an up-down view, a first widthwise side is one side in the width direction, and a second widthwise side is a side opposite to the first widthwise side,
the second axis and the oil pump are located on the first widthwise side with respect to the first axis; and
the strainer is disposed in the oil storage space at a position on the lower side of the rotary electric machine and on the second widthwise side of the oil pump so as to overlap the rotary electric machine in the up-down view.

9. The vehicle drive device according to claim 1, wherein the oil storage space that is the common space also includes the at least one of the pair of output members.

* * * * *